Patented Feb. 17, 1948

2,436,001

UNITED STATES PATENT OFFICE 2,436,001

PROCESS FOR THERMALLY WORKING MINERAL AND LIKE MASSES

John M. Gaines, Jr., Buffalo, N. Y., assignor to The Linde Air Products Company, a corporation of Ohio No Drawing. Application February 11, 1943, Serial No. 475,528

3 Claims. (Cl. 255—1.8)

This invention relates to a novel thermal process for working meltable minerals and materials of like character such as concrete and hard Soudan iron ore (hematite), employing an unbonded comminuted flux-forming fuel. More particularly, the invention relates to such a process which is particularly adapted for the piercing of deep holes in mineral masses.

In Patent 2,327,496, issued August 24, 1943, to Charles J. Burch, entitled "Method of and apparatus for working mineral materials and the like," there are disclosed a novel process and apparatus for thermo-mechanicaly working meltable mineral materials with a diffusion type oxy-fuel gas flame, as by piercing in them holes for blasting. In the aforementioned process, an intense oxy-fuel flame from a long tubular blowpipe melts off material and leaves a hole into which the blowpipe is advanced continuously. The molten material or slag separated from the mass by the flame flows from the melting zone in the fluid state, after which it is quenched within the hole by water discharged from the blowpipe and is mechanically crushed or disintegrated into small solid particles, as by rotating teeth carried on the blowpipe. The resulting small solid particles of slag thereafter are removed from the hole by water, steam formed within the hole, and the gaseous products of combustion.

Usually a continuous stream of an unbonded comminuted metallic flux-forming fuel is carried by the fuel gas into the melting zone, where it burns with the evolution of intense heat and the formation of metallic oxides. The metallic oxides combine with the molten mineral material or slag to increase its fluidity and to form a slag composition which, when quenched, may be easily crushed and disintegrated mechanically.

Another procedure for piercing meltable mineral materials involves the complete removal of the slag from the hole in the fluid condition. In this procedure, no quench followed by mechanical disintegration is necessary. Such a procedure is described in Patents 2,286,191 and 2,286,192 of R. B. Aitchison et al.; and typical apparatus for performing the process is shown in application Serial No. 470,839, filed December 31, 1942, by V. C. Williams.

An object of the present invention is the provision of a novel process for rapidly and economically thermally working masses of meltable minerals and like materials. Another object is the provision of such a novel process employing a flux-forming fuel which, when oxidized, unites with molten mineral material and forms a highly fluid slag which may be easily crushed and disintegrated after quenching.

The above and other objects, and the novel features of the invention, will become apparent from the following description.

By the term comminuted unbonded composition, used herein, is meant a composition powder wherein the individual particles are not coalesced into a large mass as opposed to a bonded composition such as a briquet wherein the particles are coalesced.

The novel process for working meltable mineral masses and the like, according to the present invention, comprises separating and removing material from such a mass and leaving a hole therein by applying an intense oxy-fuel gas flame from a blowpipe against a portion of the mass, while introducing into the flame and against the portion of the mass in the melting zone a flowing stream of the comminuted unbonded flux-forming fuel to be described in detail hereinafter.

The highly fluid slag produced by the heating action of the flame, and by the fluxing action of the metallic oxides formed by combustion of the comminuted fuel, is removed from the melting zone in the liquid state by the pressure of the gaseous products of combustion. Thereafter, the slag may be completely removed from the hole in the liquid state by the gaseous products of combustion, often assisted by an auxiliary ejection fluid such as compressed air; or preferably, the slag may be quenched within the hole by water discharged from the blowpipe near the bottom of the hole, after which it may be disintegrated mechanically, as by rotating teeth carried by the blowpipe, and the small solid particles removed from the hole by water, the gaseous products of combustion, and any steam formed within the hole. Suitable apparatus for the former procedure is disclosed in the aforementioned patent application Serial No. 470,839. Suitable apparatus for the latter thermomechanical procedure is fully disclosed in the previously mentioned Patent 2,327,496.

The process of the invention is particularly applicable to the piercing of deep blasting holes of circular cross-section extending straight into a mass of mineral material. However, the principles of the invention also may be applied to the production of other holes in the nature of grooves or cuts.

The flux-forming fuel, to which may be largely attributed the economical and rapid working of minerals by the process of the invention, comprises a comminuted unbonded composition containing in intimate relationship, by weight, 50% to 95% of aluminum, the balance being substantially all iron, and manganese. One convenient way of forming such a composition is to mix intimately together, by weight, 50% to 95% of powdered aluminum and 5% to 50% of powdered ferromanganese alloy (70% to 90% manganese, 10% to 30% iron, any balance chiefly silicon). Using ferromanganese with aluminum in the aforementioned proportions, the composition contains, by weight, 50% to 95% of aluminum, 1% to 15% of iron, and 3% to 45% of manganese. It is desirable that the particles of the flux-forming fuel be between 200 and 300 mesh (Tyler) in size, but the fineness of the particles is not particularly critical.

One specific flux-forming fuel, which has been found particularly advantageous in the process of the invention, comprises a comminuted unbonded composition containing, by weight, about 50% of aluminum, 9% of iron, and 41% of manganese. This fuel may be conveniently formed by mixing together in the pulverulent state 50% of aluminum and 50% of ferromanganese alloy (82% manganese, 17% iron, 1% silicon).

Although the flux-forming fuel compositions used in the process of the invention have been described as conveniently compounded from aluminum and ferromanganese alloy, it is to be understood that the various components in their elemental form, or in the form of other alloys, may be used with satisfactory results.

The comminuted unbonded flux-forming fuel compositions described in the preceding paragraphs, when burned in gaseous oxygen, evolve large quantities of heat at high temperatures, thus supplementing the heat of the oxy-fuel gas flame. Furthermore, the resulting metallic oxides unite with molten slag, such as the normally viscous slags of concrete and iron ore, to modify the slag compositions. The resulting modified slags have greatly increased fluidity and, after quenching, are extremely friable and may be mechanically crushed and disintegrated easily into small particles.

In an example of the thermal working of a mineral material by the process of the invention, a total of 60 feet of blasting holes was thermomechanically drilled in hard Soudan iron ore at an average speed of 2.27 inches per minute, using a flame from a long oxy-acetylene blowpipe and an acetylene-conveyed comminuted flux-forming fuel mixture, previously described, containing, by weight, about 50% of aluminum, and 50% of ferromanganese alloy. One hole 77 inches in depth was pierced at a rate of 3.5 inches per minute.

In a second example, a total of 14.5 feet of blasting holes was thermomechanically drilled in hard Soudan iron ore at an average speed of 2.58 inches per minute, using with the oxy-acetylene flame a flux-forming fuel containing, by weight, about 65% of aluminum, and 35% of ferromanganese alloy.

In a third example, a total of 55.5 feet of blasting holes was thermomechanically drilled in hard Soudan iron ore at an average speed of 2.4 inches per minute, using with the oxy-acetylene flame a comminuted flux-forming fuel containing, by weight, about 60% of aluminum, and 40% of ferromanganese alloy.

All of the drilling rates in the foregoing examples far surpass the average drilling rate of .467 inch per minute obtained with pneumatic drills in Soudan iron ore, as disclosed in U. S. Bureau of Mines Circular 6911.

What is claimed is:

1. In a process for thermally working mineral and like masses comprising separating and removing material from such a mass by applying an oxy-fuel flame to a portion thereof while introducing into such flame a comminuted flux-forming fuel, the improvement which consists in introducing said flux-forming fuel as a flowing stream of a comminuted composition containing, by weight, 50% to 95% of aluminum, 1% to 15% of iron, and 3% to 45% of manganese.

2. In a process for thermally working mineral and like masses comprising separating and removing material from such a mass by applying an oxy-fuel flame to a portion thereof while introducing into such flame a comminuted flux-forming fuel, the improvement which consists in introducing said flux-forming fuel as a flowing stream of a comminuted composition containing, by weight, about 50% of aluminum, 9% of iron, and 41% of manganese.

3. In a process for thermally working mineral and like masses comprising separating and removing material from such a mass my applying an oxy-fuel flame to a portion thereof while introducing into such flame a comminuted flux-forming fuel, the improvement which consists in introducing said flux-forming fuel as a flowing stream of a comminuted composition containing, by weight, 50% to 95% of aluminum, the balance being substantially all ferromanganese comprising 70% to 90% manganese and 10% to 30% iron.

JOHN M. GAINES, Jr.

REFERENCES CITED

The following references are of record in the file of this patent:

UNITED STATES PATENTS

| Number | Name | Date |
|---|---|---|
| 968,350 | Harrison | Aug. 23, 1910 |
| 2,327,482 | Aitchison et al. | Aug. 24, 1943 |
| 2,286,192 | Aitchison et al. | June 16, 1942 |
| 2,327,496 | Burch | Aug. 24, 1943 |
| 1,494,003 | Malcher | May 13, 1924 |
| 2,286,191 | Aitchison et al. | June 16, 1942 |

OTHER REFERENCES

Metals Handbook, 1939 edition, page 933, American Society of Metals, Cleveland, Ohio. (Copy in Div. 3.)